May 3, 1938.  N. VAN HUSEN  2,116,485
TORQUE DEVICE FOR TANDEM UNITS
Filed May 25, 1936   5 Sheets-Sheet 1

INVENTOR
Norman Van Husen,
BY
ATTORNEYS

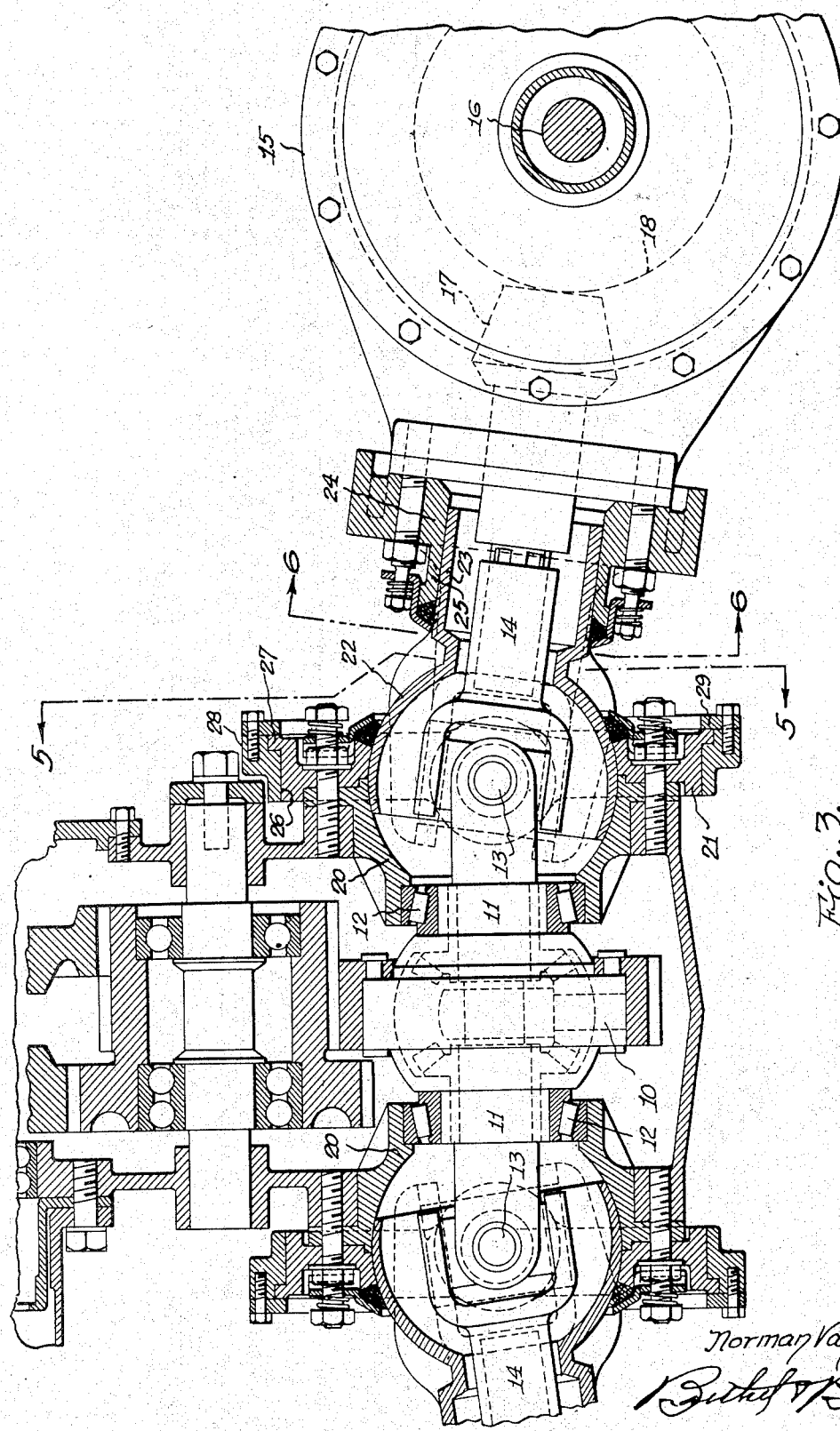

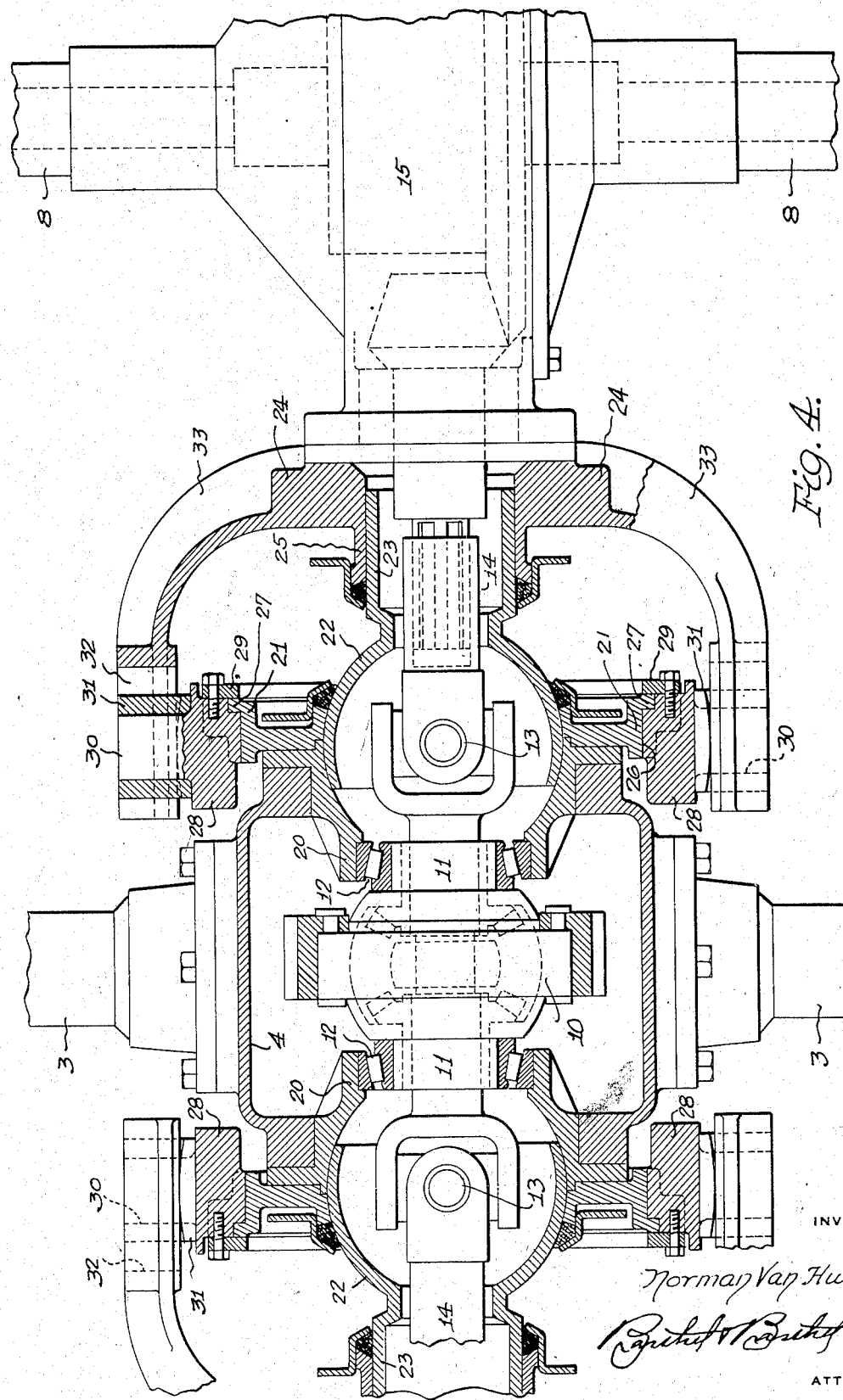

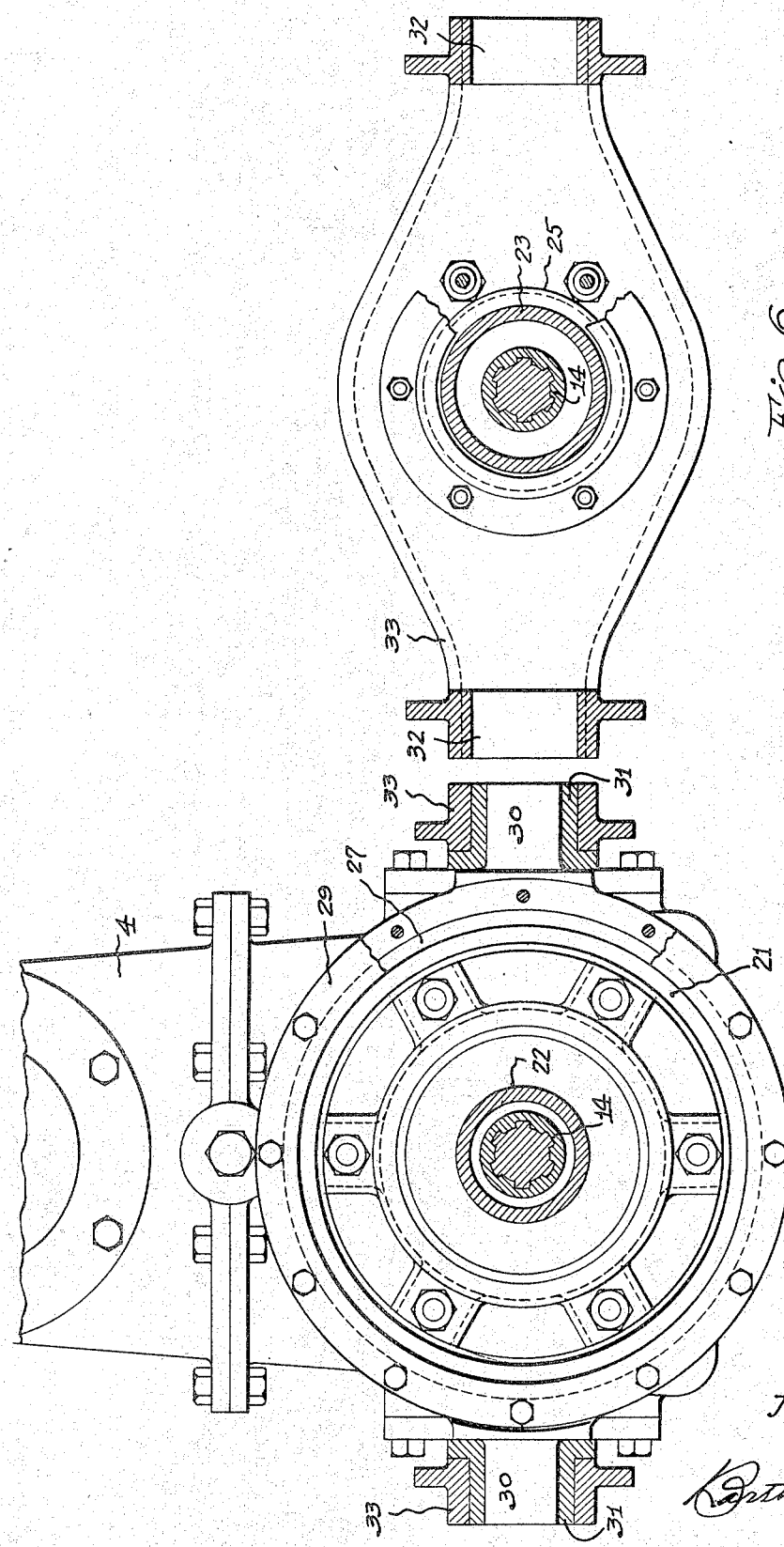

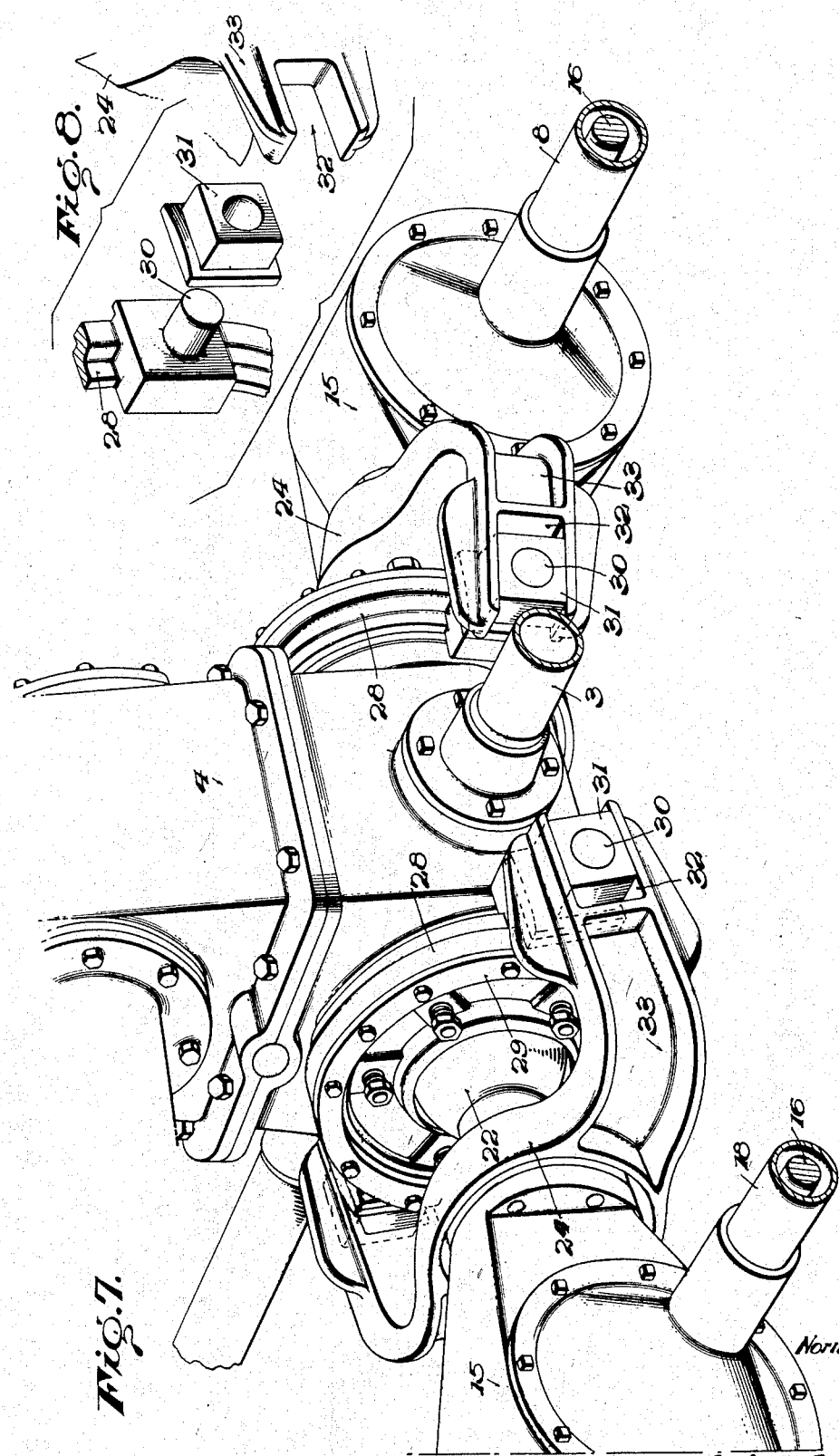

Patented May 3, 1938

2,116,485

UNITED STATES PATENT OFFICE 2,116,485

TORQUE DEVICE FOR TANDEM UNITS

Norman Van Husen, Detroit, Mich., assignor, by mesne assignments, to Patent Developers, Inc., Detroit, Mich., a corporation of Michigan Application May 25, 1936, Serial No. 81,679

14 Claims. (Cl. 180—22)

The present invention relates to dual rear axle drive units for motor vehicles, and more particularly to units wherein both axles are driven by short shafts from a change speed transmission located therebetween.

In such units, the transmission is enclosed and supported by a housing, rigid with respect to the frame of the vehicle, and the axles are connected to the frame by spring suspension means with the result that relative movement takes place between the axles and the housing. In applying power to the axles and in braking the wheels on the axles a turning moment is set up in the axle housings, and the axle housings are provided with torque means extending substantially radially thereof and engaging the transmission housing whereby the latter opposes the turning moment in the axle housings. The short shafts, as well as the torque means, are so constructed that they permit the axles to move with respect to the transmission housing and for this purpose they include universal joints and slip joints, the latter being provided to render them extensible as to length.

In units of this character as heretofore known the torque means comprises relatively telescoping tubular elements enclosing the short shafts, one of the tubular elements of each set being rigidly secured to the axle housing and the other being connected to the transmission housing by universally pivoting means. While such constructions have been found satisfactory for their intended purpose in the carrying of lighter loads, it has been found that in the case of heavy loads both braking action and propelling power are increased with a corresponding increase in the turning moment on the torque means to such an extent that excessive wear may result in the torque means, particularly in the relatively telescoping tubular parts. When such wear takes place in the torque means the turning moment in the axles imposes pressure on the short shafts and their universal joints so that in addition to transmitting power to the axles the short shafts must also oppose the torque in the axle housings, thereby resulting in a power loss as well as undesirable wear in the transmission parts.

The primary object of the present invention is to provide torque means of new and improved construction for holding the axle housings of a dual axle drive unit against rotative movement as a result of the turning moment set up therein when power is supplied thereto or when the brakes on the wheels of the unit are applied, the torque means being so constructed as to oppose such movement without incurring excessive wear, whereby it is particularly adapted for heavy load carrying vehicles. In the case of the telescoping tubular parts referred to above, the part of each set which is rigidly secured to the axle housing extends substantially radially with respect to the axis thereof and when a turning moment is present in the axle housing it acts in the nature of a lever; and because in such a construction said part must have its bearing at a point between the supporting connection of the other tubular element and the axle housing, it comprises in effect a comparatively short lever. In attaining the primary objective above mentioned this invention provides for the elimination of this short lever characteristic in the torque means and for bearing of the torque means on the transmission housing at a point more remote from the axle housing than is possible with the relatively telescoping tube construction, thus providing torque means embodying a comparatively long lever characteristic with a resulting mechanical advantage which reduces wear conditions to a minimum even under very heavy load conditions.

Another object of the invention is to provide a rugged, structurally simple device of novel character for distributing and equalizing the torque reaction of the driving axles of a tandem drive unit without imposing additional stresses upon the elements transmitting the driving power, the springs or the chassis of the vehicle.

A further object is to provide the axle housings of a dual axle drive unit with torque members of novel construction having universal connections with the transmission housing which are so arranged as to permit entire freedom of movement of the axles relative to said housing without throwing any of the torque reaction stresses upon the gearing, shafts and universal joints through which the driving power is transmitted to the axles.

With the above and other ends in view the invention is more fully disclosed with reference to the accompanying drawings, in which Fig. 1 is a fragmental plan of the rear end of a vehicle showing one form of dual rear axle drive unit embodying the invention, the transmission housing being shown in section;

Fig. 3 is a section taken on the line 3—3 of Fig. 1;

Fig. 4 is a section taken on the line 4—4 of Fig. 2;

Figures 1, 2:
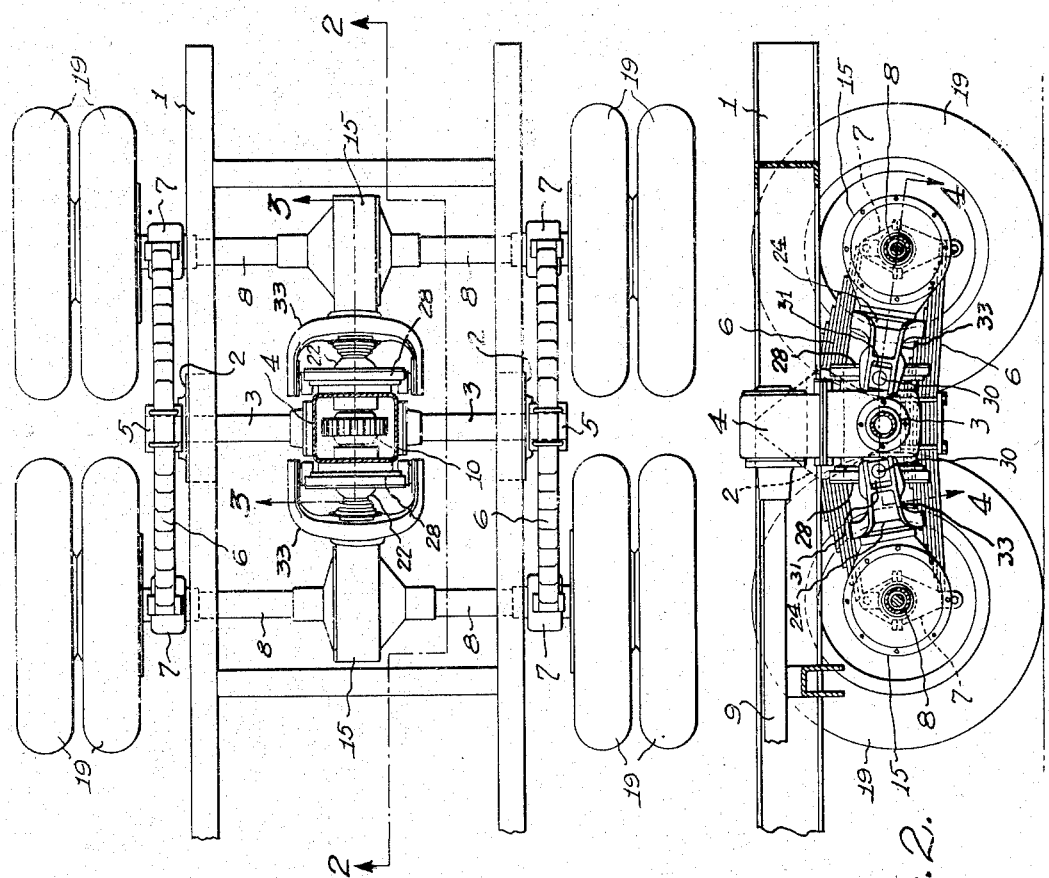
Fig. 2 is a view taken on the line 2—2 of Fig. 1.

Figs. 5 and 6 are views taken on the lines 5—5 and 6—6, respectively, of Fig. 3;

Fig. 7 is a perspective view of a portion of the drive unit shown in Figs. 1–6 illustrating the construction of the novel torque members of the present invention; and Fig. 8 is a pulled-out perspective view illustrating the manner in which the ends of the torque yokes cooperate with the gimbal rings so as to provide an extensible, universal connection therebetween.

Like characters of reference are employed throughout to designate corresponding parts.

The numeral 1 designates a vehicle frame having brackets 2 fixed thereto and receiving trunnions 3 which project laterally from a transmission housing 4 of a dual axle drive unit. The trunnions 3 are extended beyond the sides of the frame 1 and receive trunnion caps 5 on which springs 6 are mounted, the ends of the springs being connected by spring brackets 7 mounted upon the axle housings 8. A torque tube 9 is rigidly connected to the housing 4 and, although not illustrated here, it will be understood that the forward end of the torque tube 9 is connected to a rigid cross member of the vehicle frame 1. It will thus be seen that the housing 4 is stationary with respect to the frame 1 and the axle housings 8 may move with respect to the frame and the housing 4.

In the lower part of the housing 4 is a differential gear 10, supported by shafts 11 in bearings 12. Each shaft 11 is connected by a universal joint 13 to a short shaft 14 composed of two relatively sliding splined together parts which render it extensible as to length, the shaft 14 being extended into the differential housing 15 of its respective axle. As illustrative of a driving connection between the short shaft 14 and the axle 16 there is illustrated a gear 17 meshing with a gear 18. In actual practice two standard automobile or truck rear axles are employed and the gear 18 therefore represents the driving gear of a differential gearing contained in the housing 15.

The shaft 14 is supported in bearings (not shown) in the differential housing 15 and therefore when power is supplied to the shaft to rotate the axle 16 a turning moment is set up in the housing 15. Likewise, when the brakes on the wheels 19 are applied a turning moment is set up in the housing 15. This invention pertains to the means for opposing such turning moments by connecting the axle housings with the transmission housing 4.

The transmission housing 4, adjacent each universal joint 13, has a spherical segment formed of complemental parts 20 and 21 which are rigidly secured to the wall of the housing 4 and slidably receive a bell 22 having a tubular extension 23 surrounding its respective short shaft 14. A body 24 is rigidly secured to the differential housing 15 and has a tubular extension 25 receiving the end of the tubular part 23. When a turning moment is present in the housing 15 the tubular extension 25 tends to move around the axis of the housing 15 in the nature of a lever and such movement is opposed by engagement of the tubular part 23 therewith. Due to the fact that the engagement of the parts 23 and 25 is in close proximity to the axis of the housing 15 the part 25 constitutes but a short lever and, in the absence of other means to oppose the turning moment in the housing 15, excessive wear may result through contact of these parts. In the present case, other means to be presently described is provided to oppose the turning moment in the housing 15, and the parts 23 and 25, although illustrated as being sufficiently sturdy to carry a part of the load created by said turning moment in the housing 15, constitute only an enclosing means to protect the universal joints, short shafts and differentials from contact with dust, the elements, etc.

The part 21 of the spherical segment has an outer annular bearing surface 26 and an annular shoulder 27. Slidable upon the bearing surface 26 is a gimbal ring 28, the latter being retained upon the bearing surface 26 in engagement with the shoulder 27 by a removable annular retainer 29. Extending outwardly from the gimbal ring 28 are diametrically opposed trunnions 30 with bearing blocks 31 thereon, the axis of said trunnions passing transversely of the vehicle substantially through the center of universal joint 13 and hence through and at right angles to the axis of short shaft 14. The bearing blocks 31 are slidably received in slots 32 formed in the ends of a pair of arms 33 which are secured to, and preferably integral with, the body 24 at diametrically opposite points, the latter being rigidly secured to the housing 15 as above described. With this construction, it is obvious that the arms 33 are always coplanar with the short shaft 14, rotate about the axis of said shaft when the axle tilts, pivot about the axis of trunnions 30 when the axle rises or falls relatively to the transmission housing 4, and slide lengthwise or longitudinally of the vehicle relatively to bearing blocks 31 when the axle moves toward and away from the transmission housing. Each body 24 and its associated arms 33 constitute what may be termed a torque transmitting yoke which provides for complete absorption, equalization and distribution of the torque reaction of the driving axles without subjecting the other elements of the drive unit thereto.

When a turning moment is present in the housing 15 it tends to rotate the body 24 and arms 33 about the axis of the housing but such turning moment is opposed by engagement of the arms 33 with the bearings on the trunnions 30 on the gimbal ring 28. For example, assuming that the torque reaction of the axle shown at the left in Fig. 7 sets up a turning moment tending to rotate the associated axle housing 15 in a clockwise direction, it is apparent that this moment will also tend to rotate the body 24 and arms 33 of the torque transmitting yoke downwardly about the axis of the axle housing. However, the slotted ends 32 of arms 33 are encompassing bearing blocks 31 which are in turn mounted on the trunnions 30 of gimbal ring 28; and since this ring cannot move bodily downwardly because of its mounting on the bearing surface 26 which is fixed relatively to the transmission housing 4 and the vehicle frame 1, the ends of the arms 33 are positively restrained from any attempted downward movement. The turning moment is thus effectively opposed, the forces tending to produce the turning movement being partially absorbed by the body 24 and arms 23 and partially transmitted to the transmission housing 4 and vehicle frame 1.

By mounting the gimbal ring 28 for rotation upon bearing surface 26, it is possible for the axle to tilt—that is, for one wheel to rise or fall relatively to the other—without impairment of the torque absorbing and transmitting function of the elements just described and without placing any additional stresses upon the parts. Similarly, the use of bearing blocks 31 rotatably mounted on trunnions 30 and the sliding engagement between the ends of arms 33 and said blocks are features which enable the axle to rise and fall relatively to, and to move toward and away from, the transmission housing 4 without affecting the operation of the torque transmitting yoke.

The gimbal ring, being in substantially the same vertical plane as the center of its respective universal joint 13, is disposed sufficiently remote from the axis of the housing 15 to provide the equivalent of a comparatively long lever and an increased mechanical advantage. In addition, the gimbal ring has a comparatively large bearing surface providing for such distribution of its friction creating load that the possibility of excessive wear is eliminated, even in the presence of comparatively heavy vehicle load conditions.

Although a specific embodiment of the invention has been illustrated and described, it will be understood that various changes may be made within the scope of the appended claims without departing from the spirit of the invention, and such changes are contemplated.

What is claimed is:—

1. In a vehicle having dual rear axles and housings therefor, a train of gearing, a housing for said gearing disposed between said axles, extensible short shafts each having a universal joint interposed in the length thereof for driving said axles from said gearing, and means carried by each of said axle housings and operatively connected to said gear housing in such manner as to oppose turning moments in said axle housings, each of said means being rigidly connected with its associated axle housing, lengthwise slidable with respect to said gear housing to permit movement of the axle toward and away from said gear housing, and rotatable relatively to said gear housing about the axis of the associated short shaft to permit tilting of the axle relatively to said gear housing.

2. In a vehicle having dual rear axles and housings therefor, a train of gearing, a housing for said gearing disposed between said axles, extensible short shafts each having a universal joint interposed in the length thereof for driving said axles from said gearing, an element mounted on said gear housing adjacent each universal joint and rotatable relatively to said gear housing about an axis extending longitudinally of the vehicle, and rigid means each fixed at one end to an axle housing and slidably connected at its other end to one of said elements for movement relatively to the latter toward and away from said gear housing.

3. In a vehicle having dual rear axles and housings therefor, a train of gearing, a housing for said gearing disposed between said axles, extensible short shafts each having a universal joint interposed in the length thereof for driving said axles from said gearing, a gimbal ring carried by said gear housing adjacent each universal joint and rotatable relatively to said gear housing about an axis extending longitudinally of the vehicle, and a rigid element connected to each axle housing and slidably engaging one of said gimbal rings for movement relatively to the latter toward and away from said gear housing.

4. In a vehicle, an axle having a housing, a train of gearing, a housing for said gearing, an extensible shaft having a universal joint in the length thereof for driving said axle from said gearing, a torque member connected at one end to said axle housing, and means constituting a universal connection between the other end of said torque member and said gear housing, said means being so constructed and arranged that said torque member may both slide lengthwise and rotate about the axis of said shaft relatively to said gear housing and also pivot about an axis extending transversely of the vehicle and passing substantially through the center of said universal joint to permit rising and falling of the axle relatively to said gear housing.

5. In a vehicle, an axle having a housing, a train of gearing, a housing for said gearing, an extensible shaft having a universal joint in the length thereof for driving said axle from said gearing, an element mounted on said gear housing and rotatable relatively thereto about an axis extending longitudinally of the vehicle, and means rigidly attached to said axle housing at one end and slidably connected with said element at its other end for movement relatively to said element toward and away from said gear housing.

6. In a vehicle, an axle having a housing, a train of gearing, a housing for said gearing, an extensible shaft having a universal joint in the length thereof for driving said axle from said gearing, a gimbal ring carried by said gear housing adjacent said universal joint and rotatable relatively to said gear housing about an axis extending longitudinally of the vehicle, and rigid means rigidly connected at one end to said axle housing and slidably connected at its other end to said gimbal ring for movement relatively to said ring toward and away from said gear housing.

7. In a vehicle having dual rear axles and housings therefor, a train of gearing, a housing for said gearing disposed between said axles, extensible short shafts each having a universal joint interposed in the length thereof for driving said axles from said gearing, said gear housing having a spherical segment concentric with each universal joint, a ball shaped member slidably received in each spherical segment and having a tubular extension slidably engaging the adjacent axle housing, a rigid element attached to each axle housing, and universally pivoting means mounted on said gear housing and connecting said rigid elements to said gear housing in such manner that said elements may slide lengthwise and rotate about the axes of said shafts relatively to said gear housing and also pivot about axes extending transversely of the vehicle and passing substantially through the centers of said universal joints to permit rising and falling of the axles relatively to said gear housing.

8. In a vehicle having dual rear axles and housings therefor, a train of gearing, a housing for said gearing disposed between said axles, extensible short shafts each having a universal joint interposed in the length thereof for driving said axles from said gearing, said gear housing having a spherical segment concentric with each universal joint, a ball shaped member slidably received in each spherical segment and having a tubular extension slidably engaging the adjacent axle housing, a gimbal ring mounted on said gear housing adjacent the plane of each universal joint, and rotatable relatively to said gear housing about an axis extending longitudinally of the vehicle, and a rigid element attached to each axle housing and slidably engaging one of said gimbal rings for movement relatively to the latter toward and away from said gear housing.

9. In combination in a vehicle, an axle housing, a ring, means fixed with respect to the vehicle frame supporting said ring for rotation relatively thereto about an axis extending longitudinally of the vehicle, a rigid element projecting from said axle housing, and means on said ring engaging the end of said rigid element in such manner that said rigid element may slide lengthwise with respect thereto.

10. In combination in a vehicle, an axle housing, a ring, means fixed with respect to the vehicle frame supporting said ring for rotation relatively thereto about an axis extending longitudinally of the vehicle, diametrically opposed trunnion members carried by said ring, and a forked rigid element attached to said axle housing and slidably engaging said trunnion members for movement relatively to the latter longitudinally of the vehicle.

11. In combination, an axle having a housing, a train of gearing, a housing for said gearing, an extensible shaft having a universal joint interposed in the length thereof for driving said axle from said gearing, said gear housing having a ball socket concentric with said universal joint, a hollow ball member received in said socket and having a tubular extension enclosing said shaft, an element rotatably mounted on said gear housing for rotation about an axis extending longitudinally of the vehicle, and rigid means carried by said axle housing having a part thereof slidably engaging said tubular extension and a part thereof slidably engaging said rotatable element for movement relatively to said extension and element toward and away from said gear housing.

12. In combination, an axle having a housing, a train of gearing, a housing for said gearing, an extensible shaft having a universal joint interposed in the length thereof for driving said axle from said gearing, said gear housing having a ball socket concentric with said universal joint, a hollow ball member received in said socket and having a tubular extension enclosing said shaft, an element rotatably mounted on said gear housing for rotation about an axis extending longitudinally of the vehicle, laterally projecting members carried by said rotatable element, and means rigid with respect to said axle housing slidably engaging said tubular extension and said members carried by said rotatable element for movement relatively to said extension and members toward and away from said gear housing.

13. In a dual rear axle drive unit for a motor vehicle, a pair of driving axles and housings therefor, a transmission gear casing disposed between the axles and rigidly supported by the frame of the vehicle, driving shafts extending from said gear casing to said axles, a pair of torque transmitting yoke members each connected at one end to one of the axle housings and having a pair of parallel arms at its outer end embracing a portion of said transmission gear casing, and means constituting a universal connection between the parallel arms of each of said yoke members and said gear casing, said universal connections being so constructed and arranged that the yoke members may rotate relatively to said gear casing about the axes of said driving shafts and also pivot about axes extending transversely of the vehicle and passing substantially through and at right angles to the axes of said driving shafts.

14. In a dual rear axle drive unit for a motor vehicle, a pair of driving axles and housings therefor, a transmission gear casing disposed between the axles and rigidly supported by the frame of the vehicle, driving shafts extending from said gear casing to said axles, and a pair of torque transmitting members each connected at one end to one of the axle housings and having a universal connection at its other end with said transmission gear casing, said yoke members and universal connections being so constructed and arranged that the yoke members may rotate relatively to said gear casing about the axes of said driving shafts and also pivot about axes extending transversely of the vehicle and passing substantially through and at right angles to the axes of said driving shafts while at the same time each axle and its housing may move independently toward and away from said gear casing.

NORMAN VAN HUSEN.